(12) United States Patent
Heikkilä

(10) Patent No.: US 9,554,251 B2
(45) Date of Patent: Jan. 24, 2017

(54) USER TERMINAL WITH IMPROVED FEEDBACK POSSIBILITIES

(75) Inventor: Gunnar Heikkilä, Gammelstad (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 149 days.

(21) Appl. No.: 14/376,457

(22) PCT Filed: Feb. 6, 2012

(86) PCT No.: PCT/SE2012/050107
§ 371 (c)(1),
(2), (4) Date: Aug. 4, 2014

(87) PCT Pub. No.: WO2013/119149
PCT Pub. Date: Aug. 15, 2013

(65) Prior Publication Data
US 2015/0004950 A1 Jan. 1, 2015

(51) Int. Cl.
*H04M 3/42* (2006.01)
*H04W 4/02* (2009.01)
(Continued)

(52) U.S. Cl.
CPC .............. *H04W 4/027* (2013.01); *G06F 3/017* (2013.01); *G06F 3/0346* (2013.01);
(Continued)

(58) Field of Classification Search
CPC ..... H04W 4/027; G06F 3/017; G06F 3/04883; H04M 3/51; H04M 2250/12
(Continued)

(56) References Cited

U.S. PATENT DOCUMENTS 8,339,367 B2* 12/2012 Dods ..................... G06F 1/1694
345/169
8,340,695 B2* 12/2012 Song ..................... G09B 29/10
455/456.1

(Continued)

FOREIGN PATENT DOCUMENTS

EP 1705588 A1 9/2006
EP 2224314 A1 9/2010
WO WO 2009/016607 2/2009

OTHER PUBLICATIONS

PCT International Preliminary Report on Patentability for International application No. PCT/SE2012/050107, Aug. 12, 2014.
(Continued)

*Primary Examiner* — Marceau Milord
(74) *Attorney, Agent, or Firm* — Patents on Demand, P.A.; Brian K. Buchheit; Scott M. Garrett

(57) ABSTRACT

A user terminal (100) for a cellular communications system, equipped with means (115, 130, 105) for making and receiving transmissions in the cellular communications system. The user terminal (100) is equipped with a motion sensor (135) for sensing movements of the user terminal (100), and the user terminal (100) is also equipped with a reporting function (140) for reporting movements sensed by the motion sensor (135) to another party in the cellular communications system if said movements exceed a predefined threshold in duration and/or in magnitude. In embodiments, the reporting function (140) is arranged to include one or more of the direction, duration or magnitude of said movements in its reporting.

24 Claims, 2 Drawing Sheets

(51) Int. Cl.
*G06F 3/01* (2006.01)
*G06F 3/0488* (2013.01)
*G06F 3/0346* (2013.01)
*H04M 3/51* (2006.01)

(52) U.S. Cl.
CPC ........... *G06F 3/04883* (2013.01); *H04M 3/51* (2013.01); *H04M 2250/12* (2013.01)

(58) Field of Classification Search
USPC .................. 455/414.1, 550.1, 556.1, 556.2
See application file for complete search history.

(56) References Cited

U.S. PATENT DOCUMENTS

| | | | | |
|---|---|---|---|---|
| 8,428,564 | B2* | 4/2013 | Reilly | G06F 17/30884 455/414.1 |
| 8,429,564 | B2* | 4/2013 | Alexanderovitc | G06F 1/1626 715/757 |
| 8,749,573 | B2* | 6/2014 | Ali | G02B 27/0176 345/592 |
| 8,775,969 | B2* | 7/2014 | Fan | H04M 1/274558 715/810 |
| 8,890,864 | B2* | 11/2014 | Seol | H04N 5/232 345/419 |
| 8,935,627 | B2* | 1/2015 | Ryu | G06F 3/0483 345/173 |
| 8,935,637 | B2* | 1/2015 | Kim | G06F 1/1626 345/156 |
| 8,965,350 | B2* | 2/2015 | Agsteiner | H04M 1/72544 455/416 |
| 9,013,474 | B2* | 4/2015 | Park | G06F 3/147 345/419 |
| 9,021,393 | B2* | 4/2015 | Kim | G06F 3/0481 707/E17.114 |
| 2003/0095154 | A1* | 5/2003 | Colmenarez | G06F 3/017 715/863 |
| 2005/0212767 | A1* | 9/2005 | Marvit | G06F 1/1626 345/158 |
| 2005/0264519 | A1 | 12/2005 | Appleyard et al. | |
| 2006/0028429 | A1 | 2/2006 | Kanevsky et al. | |
| 2006/0061654 | A1 | 3/2006 | McKay et al. | |
| 2009/0256809 | A1* | 10/2009 | Minor | G06F 3/03547 345/173 |
| 2009/0265671 | A1 | 10/2009 | Sachs et al. | |
| 2009/0325565 | A1 | 12/2009 | Backholm | |

OTHER PUBLICATIONS

PCT International Search Report for International Application No. PCT/SE2012/050107; International Filing Date Jun. 2, 2012.

* cited by examiner

USER TERMINAL WITH IMPROVED FEEDBACK POSSIBILITIES

PRIORITY

This nonprovisional application is a U.S. National Stage Filing under 35 U.S.C. §371 of International Patent Application Serial No. PCT/SE2012/050107, filed Feb. 6, 2012 and entitled "A User Terminal with Improved Feedback Possibilities."

TECHNICAL FIELD

The present invention discloses a user terminal for a cellular communications system, with improved feedback possibilities.

BACKGROUND

Cellular communications systems have expanded from simple speech-only systems to platforms for a multitude of different services, many of them based on IP, i.e. the Internet Protocol. Many of these services are not directly provided by the operator of the cellular communications systems, thus making it difficult for the operator to know if the service quality of the cellular communications systems is sufficient for those services or not.

An additional problem for an operator of a cellular communications systems is to know if or when a user of a user terminal on which a certain service or application is being executed is dissatisfied, since different users might have different tolerance levels. This makes it hard for an operator of a cellular communications systems to adjust the network resources, priorities etc., which otherwise could be used as a way of improving the user's service quality when needed.

SUMMARY

It is an object of the invention to obviate at least some of the disadvantages mentioned above and to provide an improved user terminal for a cellular communications system.

This object is obtained by means of a user terminal for a cellular communications system. The user terminal is equipped with means for making and receiving transmissions in the cellular communications system, and in addition, the user terminal is equipped with a motion sensor for sensing movements of the user terminal.

The user terminal is also equipped with a reporting function for reporting movements sensed by the motion sensor to another party in the cellular communications system if those movements exceed a predefined threshold in duration and/or in magnitude.

Thus, if a user for example, shakes his user terminal, this may be sensed by the motion sensor and reported by the reporting function as a sign of, for example, frustration to the operator of the cellular communications system. This is so in particular if the user is aware of the reporting function and its thresholds, so that the user knows that certain movements of the user terminal will be reported as a sign of e.g. frustration to the cellular communications system In embodiments of the user terminal, the reporting function is arranged to include one or more of the direction, duration or magnitude of the movements in its reporting. By means of this, it is possible for an operator of a cellular communications system to ascertain a user's degree of a sentiment such as dissatisfaction, if the sentiment has been expressed by means of moving the user terminal.

In embodiments of the user terminal, the reporting function is arranged to report movements which match a movement pattern stored in the reporting function of in the telephone, where the movement pattern is defined as a pattern displaying a defined sentiment of the user who uses the user terminal. In some such embodiments of the user terminal, the defined sentiment is dissatisfaction.

In embodiments of the user terminal, the reporting function is also arranged to include in its reporting information on an application which was being executed and displayed on a display of the user terminal when said movements were sensed by the motion sensor.

In embodiments of the user terminal, the reporting function is also arranged to include in its reporting system data relating to the cellular communications system.

In embodiments, the user terminal is arranged to install the reporting function from or via the cellular communications system.

In embodiments of the user terminal, the reporting function is arranged to have a "training function", by means of which movements of the user terminal which are performed during a "training session" will be recognized by the reporting function as movements which should be compared to said thresholds in order to be included in said reporting if the thresholds are exceeded.

In embodiments, the user terminal is arranged to transmit reports from the reporting function to said other party in the cellular communications system via the user plane in the cellular communications system.

In embodiments, the user terminal is arranged to transmit reports from the reporting function to said other party in the cellular communications system via a control channel in the cellular communications system.

In embodiments of the user terminal, the reporting function is arranged to display the magnitude and/or duration of said movements on a display of the user terminal.

In embodiments, the user terminal is arranged to receive an acknowledgement of said reporting from another party in the cellular communications system.

In embodiments, the user terminal is arranged to receive an instruction or information from another party in the cellular communications system as a result of the reporting of the reporting function.

There is also disclosed a method for operating a user terminal in a cellular communications system. The method comprises sensing movements of the user terminal, comparing those movements to one or more thresholds in duration and/or in magnitude, and reporting movements sensed to another party in the cellular communications system if the movements exceed the one or more thresholds.

In embodiments of the method, the reporting includes one or more of the direction, duration or magnitude of said movements.

In embodiments of the method, the reporting comprises reporting movements which match a pre-defined movement pattern, said pre-defined movement pattern being defined as a pattern displaying a defined sentiment of the user who uses the user terminal. In some such embodiments of the method, the defined sentiment is dissatisfaction.

In embodiments of the method, the reporting also includes information on an application which was being executed and displayed on a display of the user terminal when the movements were sensed.

In embodiments of the method, the reporting includes system data for the cellular communications system.

BRIEF DESCRIPTION OF THE DRAWINGS

The invention will be described in more detail in the following, with reference to the appended drawings, in which.

DETAILED DESCRIPTION

Figure 1:
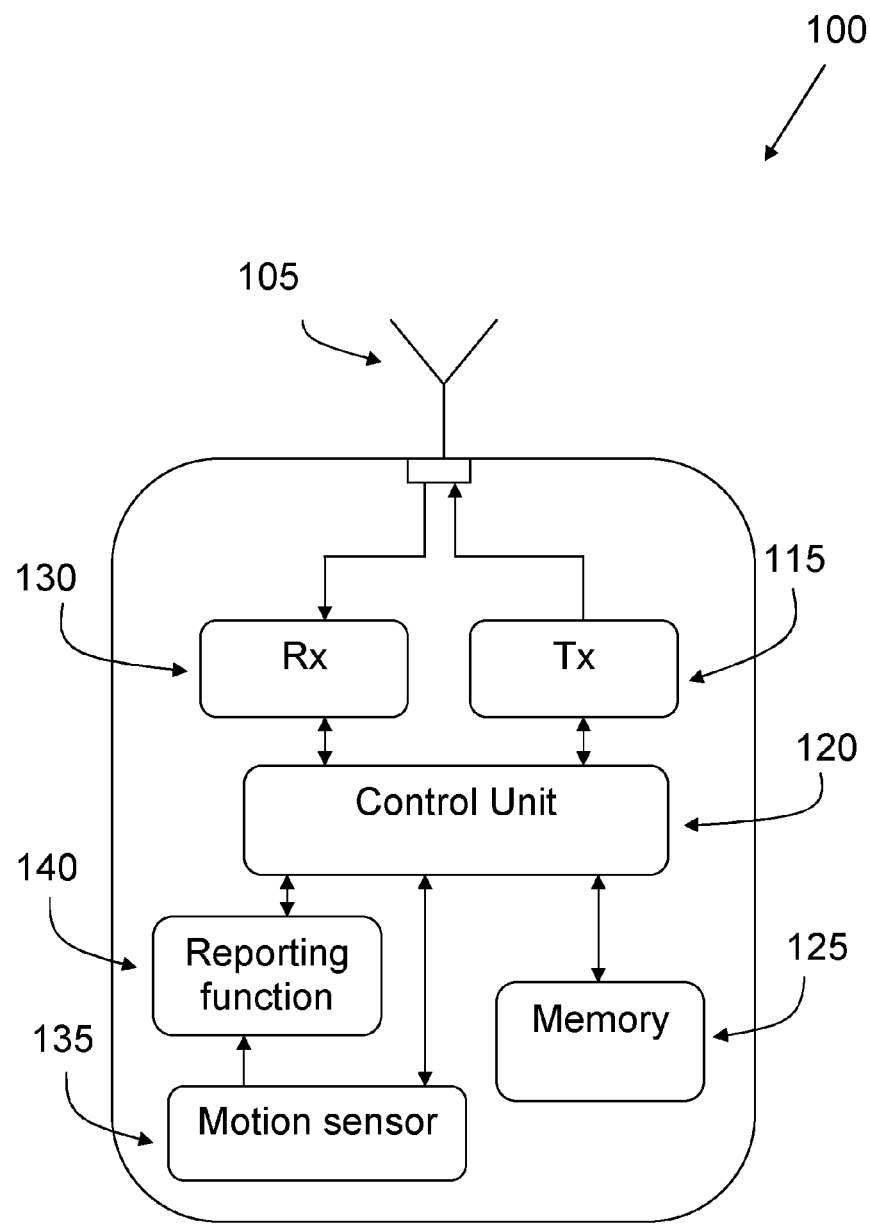
FIG. 1 shows a schematic block diagram of a user terminal.

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

FIG. 1 shows a schematic block diagram of a user terminal 100. The user terminal 100 is arranged to make and receive transmissions in a cellular communications system by means of such components as an antenna unit 105, a receive unit ("Rx") 130 and a transmit unit ("Tx") 115.

The function of the user terminal 100 is mainly controlled by a control unit 120, which has access to a memory unit 125.

As is also shown in FIG. 1, the user terminal 100 comprises a motion sensor 135 for sensing movements of the user terminal. One example of a motion sensor is a so called accelerometer, although other kinds of motion sensors can also be used. The motion sensor 135 detects movements of the user terminal 100 in one or more dimensions; in the case of two or more dimensions the dimensions are suitably perpendicular to each other. The motion sensor 135 transmits its detections of movements of the user terminal to the control unit 120 and also to a reporting function 140 which is arranged in the user terminal. Naturally, the motion sensor 135 can also be arranged to transmit its detections of movements of the user terminal to the reporting function 140 via the control unit 120, or vice versa, to the control unit 120 via the reporting function 140.

The reporting function 140 is arranged to report movements sensed by the motion sensor 135 to another party in the cellular communications system if those movements exceed a predefined threshold in duration and/or in magnitude, in which case the reporting function 140 utilizes the transmit functions of the user terminal 100, e.g. the transmit unit 130 and the antenna unit 105 in order to report to said other party in the cellular communications system that movements of the user terminal 100 have exceeded the predefined threshold in duration and/or in magnitude. Suitably, the control function 120 is also arranged to assist the reporting function 140 in making such reports.

The term "another party in the cellular communications system" is used as a generic term in order to denote the recipient of the report from the reporting function 140 since such a recipient may be located in a variety of nodes in the cellular communications system. The recipient (the "another party") may also vary depending on the application which is being executed on the user terminal at the moment, and if a number of applications are being executed simultaneously, on a "main" application which is displayed on a display of the user terminal at the moment. For example, for a circuit switched voice session, the recipient can be an MGW, i.e. a Media Gateway, for an IMS based VoIP voice session, the recipient can be an MTAS, i.e. a Multimedia Telephony Application Server, and for packet access based sessions (e.g. "surfing" the Internet) the recipient could be a PGW, i.e. a Packet Gateway. However, an operator of a cellular communications system can in principle decide more or less arbitrarily which node in his system that he wishes to receive such reports. In this context it should be pointed out that the recipient of the reports from the reporting function does not have to be the "immediate" recipient, i.e. the report can be routed to the recipient via other nodes in the system before it reaches the recipient mentioned here.

Thus, the reporting function 140 is suitably arranged to compare the movements of the user terminal which are reported to it by the motion sensor 135 with a compound (several dimensions) movement threshold, or one threshold in each of the one or more dimensions in which the motion sensor 135 is arranged to sense movements of the user terminal 100. As mentioned, the threshold or thresholds can be either in the magnitude or the duration of the movement or in both magnitude and duration. If the threshold or thresholds is/are exceeded, the report is transmitted by the reporting function 140. In various embodiments, the reporting function is arranged to include the direction (i.e. dimension) and/or the duration or magnitude of the movement, where the magnitude can either be absolute or in terms of how much the threshold is exceeded.

In embodiments, the reporting function 140 is arranged to compare detected movements which exceed said threshold or thresholds with a pre-defined movement pattern, where the pre-defined movement pattern is defined as identifying a certain sentiment of the user who is moving the user terminal 100. For example, a certain movement pattern can be stored in the reporting function 140 or in the memory function 125 where it is accessed by the reporting function either directly or via the control unit 120. The stored movement pattern is compared to the detected movements and if a "match" is found, the reporting function reports that the sentiment has been displayed by the user of the user terminal 100. As an example, one sentiment which a pre-defined movement pattern could be defined as identifying is frustration, and the pre-defined movement pattern could then, for example, be a shaking of the user terminal 100 in one or more directions with a certain magnitude and/or speed. Other examples of sentiments include dissatisfaction and anger, or positive sentiments such as satisfaction or happiness. Naturally, more than one sentiment can be arranged to be identified, and thus reported, by their respective movement patterns by the reporting function. In addition, the "degree" of the sentiment expressed can also be included, if more than one threshold is used, where a first threshold is used to express the sentiment at all, and higher thresholds are used to express successive levels of sentiments such as, for example, dissatisfaction or frustration.

In order to further facilitate for the operator of the cellular communications system, the reporting function is also, in embodiments, arranged to include with its reports or reporting information, information on an application which was being executed and/or displayed on a display of the user terminal when the movements were detected which exceeded said threshold or thresholds. In this manner, the operator of the cellular system can gain a greater understanding of which applications which are particularly sensitive to, for example, congestion in the system, or which applications that do not function particularly well, in particular on certain kinds of user terminals, if that information is also included by the reporting function.

In embodiments, the reporting function 140 is arranged to include in its reporting system data for the cellular communications system, such as, for example, data on the "radio environment", e.g. cell ID, signal strength, etc, as well as the user position (e.g. GPS data).

The reporting function 140 can either be installed on the user terminal when the user terminal is sold to the user, or, as an alternative, the reporting function can be arranged to be installed in the user terminal from the cellular communications system at a later point in time, for example if the reporting function 140 is bought and paid for by a user of the user terminal 100.

In addition, in embodiments, the reporting function 140 is arranged to display a sentiment which has been identified to a user of the user terminal 100, suitably on a display of the user terminal 100. For example, if the movement pattern of the user terminal 100 has been identified by the reporting function as matching the pre-defined pattern of frustration, a text or symbol signifying frustration can be displayed on the user terminal's display, in embodiments along with a degree of frustration (or the sentiment in question), for example in the form of histogram. As an alternative, the magnitude and/or duration of the movements which are associated with a certain sentiment can also be displayed on the user terminal's display.

In embodiments, the reporting function 140 has a "training function" by means of which a user can "teach" the reporting function the pre-defined movement pattern or patterns which are to be associated with a certain sentiment. As an example, a user would then select from a menu one of a number of sentiments which the reporting function is arranged to report to the other node in the cellular communications system, for example the sentiment "frustration". Once the sentiment has been selected, the user initiates the training session, suitably either prompted by the reporting function or by prompting (by the push of a button, etc.) the reporting function to initiate the training session. During the training session, the user performs the movement pattern which he wishes to associate with the chosen sentiment. The training session can be terminated in a number of ways, but suitably the reporting function signals to the user that the training has been successfully completed, i.e. that the movement patterns have been successfully stored by the reporting function, a signaling which can be performed via the display of the user terminal 100 or by means of an acoustic signal or by vibration of the user terminal 100, etc. In embodiments, a training session is terminated by the user, e.g. by pressing a button on the user terminal 100.

In embodiments, the reporting function 140 is arranged to have a "logging function", i.e. a function that logs sentiments that have been identified and data associated with them, for example how many times each sentiment has been identified during a certain period (24-hours, week, month, etc) and at which points in time, and at which levels, if multiple levels of a certain sentiment can be expressed, as explained previously.

Turning now to how the reports from the reporting function 140 are transmitted, this can essentially be done in one of two ways: either the reports are transmitted via the user plane of the cellular communications system, or the reports are transmitted via the control plane of the cellular communications system, in which case the reports can be made part of existing so called MDT (Minimization of Drive Tests) measurements.

In embodiments, the user terminal 100 is arranged to receive an ACK, i.e. an acknowledgement of reports sent from the reporting function 140 to the other party in the cellular communication system. Such an ACK is suitably transferred to the reporting function 140 by means of the control function 120 of the user terminal 100. Together with, or separately from such ACKs, the user terminal is in embodiment also arranged to receive instructions or information from another party in the cellular communications system as a result of reports from the reporting function 140, suitably but not necessarily from the party which receives the reports from the reporting function 140. Such instructions or information can include information regarding why the service to the user is degraded at the moment ("temporary network congestion", "temporarily degraded signal", etc), as well an estimated point in time when full service will be restored, and possibly also actions which the user might take to eliminate the reasons for a sentiment expressed by the user, e.g. frustration, which might be alleviated by means of changing a subscription level.

Figure 2:
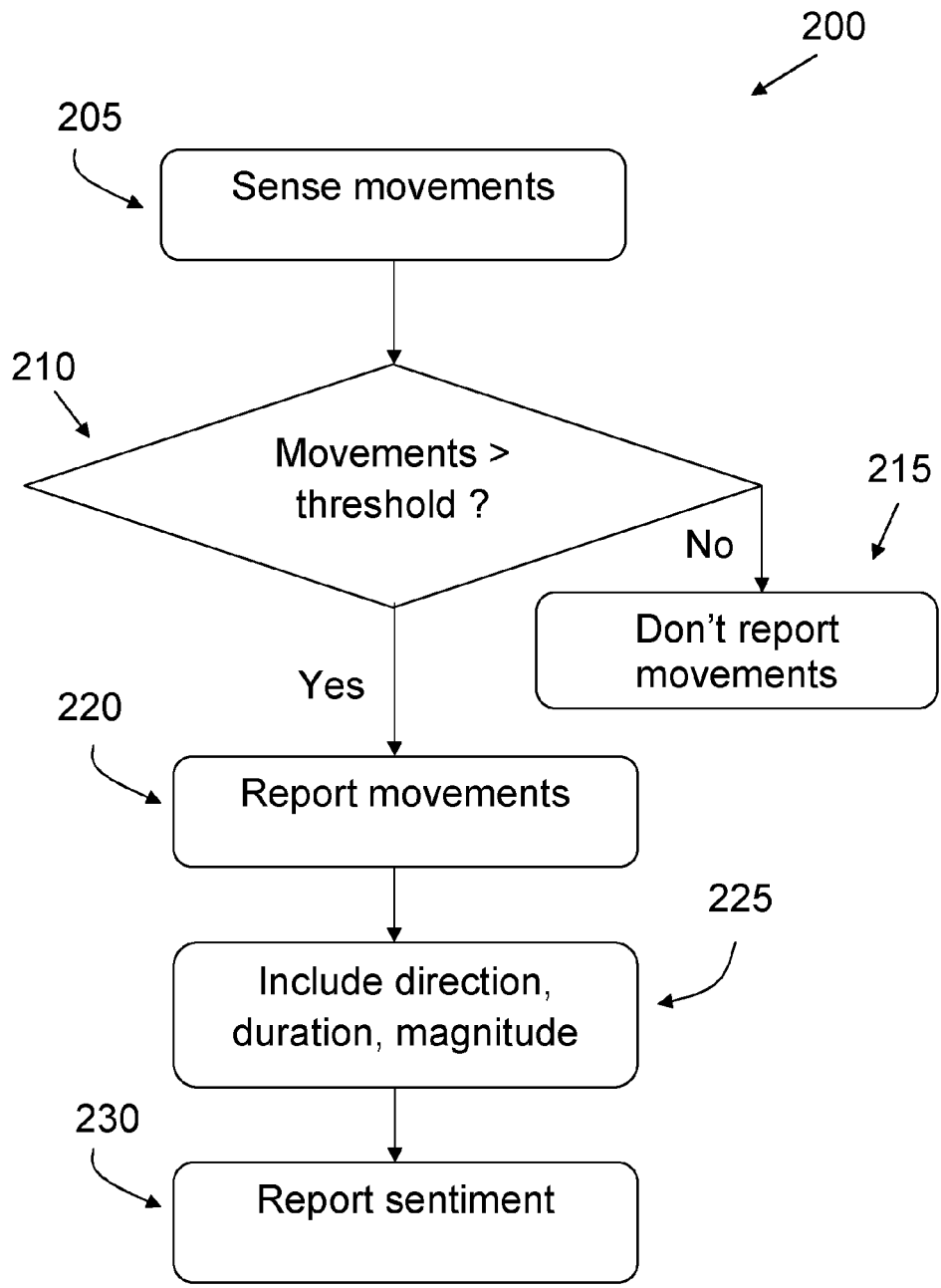
FIG. 2 shows a flow chart of a method for operating a user terminal.

FIG. 2 shows a flowchart of a method 200 for operating a user terminal such as the one 100 in FIG. 1 in a cellular communications system. The method 200 comprises, step 205, sensing movements of the user terminal ("sense movements"), and, step 210, comparing those movements to one or more thresholds in duration and/or in magnitude. The method 200 also comprises, step 220, reporting movements sensed to another party in the cellular communications system if said movements exceed said one or more thresholds. If the movements do not exceed the one or more thresholds, no reporting action is taken, as shown in step 215

In embodiments of the method 200, as shown in step 225, the reporting includes one or more of the direction, duration or magnitude of said movements.

In embodiments of the method 200, as shown in step 225, the method 200 comprises reporting movements which match a pre-defined movement pattern, said pre-defined movement pattern being defined as a pattern displaying a defined sentiment of the user who uses the user terminal. In some such embodiments, the defined sentiment is dissatisfaction.

In embodiments of the method 200, the reporting also includes information on an application which was being executed and displayed on a display of the user terminal when the movements were sensed.

In embodiments of the method 200, the reporting also includes system data for the cellular communications system.

In embodiments of the method 200, the reporting a reporting function is installed in the user terminal from or via the cellular communications system.

In embodiments of the method 200, the reporting is carried out via the user plane in the cellular communications system.

In embodiments of the method 200, the reporting is carried out via a control channel in the cellular communications system.

In embodiments, the method 200 comprising receiving an acknowledgement of said reporting from another party in the cellular communications system.

In embodiments, the method comprises receiving an instruction or information from another party in the cellular communications system as a result of the reporting.

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention claimed is:

1. A user terminal for a cellular communications system, the user terminal comprising: a communication unit for making and receiving transmissions in the cellular communications system; a motion sensor for sensing movements of the user terminal; and a reporting function for reporting sensed movements as a user response for a service to at least one of a network node and a network operator of the cellular communications system, if said movements exceed a predefined threshold in duration and/or in magnitude, wherein said reporting function reports ones of the sensed movements which match a movement pattern stored in the reporting function of the user terminal, said movement pattern corresponding to a pattern of a user who uses the user terminal, which is a mobile device of the user, wherein the pattern of the user is indicative a defined sentiment of the user.

2. The user terminal of claim 1, in which said reporting function includes one or more of the direction, duration or magnitude of said movements in its reporting.

3. The user terminal of claim 1, wherein the defined sentiment of the user is frustration.

4. The user terminal of claim 1, in which said defined sentiment is dissatisfaction.

5. The user terminal of claim 1, in which the reporting function includes in its reporting information on an application which was being executed and displayed on a display of the user terminal when said movements were sensed by the motion sensor.

6. The user terminal of claim 1, in which the reporting function includes in its reporting system data for the cellular communications system.

7. The user terminal of claim 1, installs the reporting function from or via the cellular communications system.

8. The user terminal of claim 1, in which the reporting function has a "training function", by which movements of the user terminal performed during a "training session" will be recognized by the reporting function as movements, which are compared to said thresholds in order to be included in said reporting if the thresholds are exceeded.

9. The user terminal of claim 1, transmits reports from the reporting function to at least one of a network node and a network operator of the cellular communications system via a user plane in the cellular communications system.

10. The user terminal of claim 1, transmits reports from the reporting function to at least one of a network node and a network operator of the cellular communications system via a control channel in the cellular communications system.

11. The user terminal of claim 1, in which the reporting function displays the magnitude and/or duration of said movements on a display of the user terminal.

12. The user terminal of claim 1, receives an acknowledgement of said reporting from at least one of a network node and a network operator of the cellular communications system.

13. The user terminal of claim 1, receives an instruction or information from at least one of a network node and a network operator of the cellular communications system as a result of the reporting of the reporting function.

14. A method for operating a user terminal in a cellular communications system, the method comprising: sensing movements of the user terminal; comparing those movements to one or more thresholds in duration and/or in magnitude; and reporting sensed movements as a user response for a service to at least one of a network node and a network operator of the cellular communications system, if said movements exceed said one or more thresholds, wherein ones of the sensed movements that are reported match a movement pattern stored in a reporting function of the user terminal, said movement pattern corresponding to a pattern of a user who uses the user terminal, which is a mobile device of the user, wherein the pattern of the user is indicative a defined sentiment of the user.

15. The method of claim 14, according to which said reporting includes one or more of the direction, duration or magnitude of said movements.

16. The method of claim 14, wherein the defined sentiment is frustration.

17. The method of claim 14, according to which said defined sentiment is dissatisfaction.

18. The method of claim 14, according to which the reporting also includes information on an application which was being executed and displayed on a display of the user terminal when said movements were sensed.

19. The method of claim 14, according to which the reporting also includes system data for the cellular communications system.

20. The method of claim 14, according to which a reporting function is installed in the user terminal from or via the cellular communications system.

21. The method of claim 14, according to which the reporting is carried out via a user plane in the cellular communications system.

22. The method of claim 14, according to which the reporting is carried out via a control channel in the cellular communications system.

23. The method of claim 14, comprising receiving an acknowledgement of said reporting from at least one of a network node and a network operator of the cellular communications system.

24. The method of claim 14, comprising receiving an instruction or information from at least one of a network node and a network operator of the cellular communications system as a result of said reporting.

* * * * *